(12) United States Patent
Wong et al.

(10) Patent No.: US 8,671,164 B2
(45) Date of Patent: *Mar. 11, 2014

(54) EFFICIENT SIZE OPTIMIZATION OF VISUAL INFORMATION OR AUDITORY INFORMATION

(75) Inventors: Mark Kar Hong Wong, Redmond, WA (US); Trevin Chow, Seattle, WA (US); Zachary Steven Emmel, Redmond, WA (US); Nathan D. Kile, Jr., Seattle, WA (US); Derek Lynn Jamison, Bellevue, WA (US); Jennifer N. Maertens, Redmond, WA (US); Justin James Watkins, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,567

(22) Filed: May 16, 2012

(65) Prior Publication Data

US 2012/0226671 A1    Sep. 6, 2012

Related U.S. Application Data

(63) Continuation of application No. 12/186,518, filed on Aug. 6, 2008, now Pat. No. 8,204,964.

(51) Int. Cl.
*G06F 15/16* (2006.01)
(52) U.S. Cl.
USPC ............ 709/219; 709/223; 709/225; 709/247
(58) Field of Classification Search
USPC .................................. 709/219, 223, 225, 247
See application file for complete search history.

(56) References Cited

U.S. PATENT DOCUMENTS

| | | | |
|---|---|---|---|
| 6,275,301 B1 * | 8/2001 | Bobrow et al. | 358/1.2 |
| 6,408,315 B1 | 6/2002 | McManus et al. | |
| 6,941,019 B1 * | 9/2005 | Mitchell et al. | 382/232 |
| 7,110,596 B2 | 9/2006 | Simard et al. | |
| 7,181,072 B2 | 2/2007 | Wang et al. | |
| 7,181,076 B1 | 2/2007 | Payton | |
| 7,194,149 B2 | 3/2007 | Westphal et al. | |
| 7,224,839 B2 | 5/2007 | Zeineh | |
| 7,280,700 B2 | 10/2007 | Tourapis et al. | |
| 7,308,490 B2 | 12/2007 | Peiffer et al. | |

(Continued)

OTHER PUBLICATIONS

"Adobe Photoshop 5.5", 1999, Adobe Systems Incorporated, pp. 1-15.

(Continued)

*Primary Examiner* — Phuoc Nguyen
(74) *Attorney, Agent, or Firm* — Andrew Sanders; Micky Minhas

(57) ABSTRACT

A file, including visual information or auditory information may be uploaded to a processing device. Respective portions of content of the file may be identified for compressing and saving at respective bit rates. A number of component files may be created, compressed and saved, at the respective bit rates, based on the identified respective portions of content of the file. A network page, including a reference to the uploaded file, may be created. The reference to the uploaded file, in the network page, may be replaced with references to the compressed, saved component files and the network page may be saved. A processing device of a user may request the network page and the compressed, saved component files. A reasonable facsimile of the file may be reproduced based on an aggregate of the compressed, saved component files.

20 Claims, 7 Drawing Sheets

(56) References Cited

U.S. PATENT DOCUMENTS

| | | |
|---|---|---|
| 7,400,349 B2 | 7/2008 | Okada |
| 7,463,775 B1 * | 12/2008 | Sites .............................. 382/232 |
| 7,769,900 B1 | 8/2010 | Chalfin et al. |
| 2002/0107988 A1 | 8/2002 | Jordan |
| 2003/0202697 A1 * | 10/2003 | Simard et al. ................. 382/195 |
| 2004/0010622 A1 | 1/2004 | O'Neill et al. |
| 2004/0022447 A1 | 2/2004 | Mukhopadhyay et al. |
| 2004/0022453 A1 | 2/2004 | Kusama et al. |
| 2004/0078491 A1 | 4/2004 | Gormish et al. |
| 2004/0111473 A1 | 6/2004 | Lysenko et al. |
| 2004/0213472 A1 | 10/2004 | Kodama et al. |
| 2005/0120094 A1 | 6/2005 | Tuli |
| 2006/0017835 A1 | 1/2006 | Jacobsen |
| 2006/0093230 A1 | 5/2006 | Hochmuth et al. |
| 2008/0178286 A1 | 7/2008 | Deyo |
| 2009/0096927 A1 | 4/2009 | Camp et al. |
| 2009/0129693 A1 | 5/2009 | Bloebaum et al. |
| 2010/0264525 A1 * | 10/2010 | Camacho et al. ............. 257/666 |

OTHER PUBLICATIONS

"JPEG Compression, Quality and File Size", 2008, Calvin Hass, pp. 1-11.

"Creating Graphics for the Web", Wide Area Communications, 1996, pp. 1-3.

Heredia, et al., "Using Multiresolution and Multistreaming for Faster Access in Image Database Broadcast", IEEE, 1998, pp. 784-788.

Bottou, et al., "High Quality Document Image Compression with DjVu", Journal of Electronic Imaging, vol. 7, Jul. 13, 1998, pp. 1-25.

* cited by examiner

EFFICIENT SIZE OPTIMIZATION OF VISUAL INFORMATION OR AUDITORY INFORMATION

This application claims priority to and is a continuation application of copending U.S. patent application Ser. No. 12/186,518, filed in the U.S. Patent and Trademark Office on Aug. 6, 2008.

BACKGROUND

Websites are designed to favorably impress viewers by providing interactive visual, as well as auditory, experiences. When building a website, a website designer considers an amount of visual data, as well as auditory data, to be transferred. A large amount of data may cause a web page to load slowly, thereby degrading a user's website experience. A large amount of data may also increase storage costs and bandwidth consumption.

Some website designers have increased compression ratios for visual assets to be presented by the website. As a result, a user may observe jagged edges around presented visual data, posterization, or other noticeable loss in image quality. Increasing compression ratios for auditory assets by the website may cause a noticeable loss in audio quality. As a result, a user's website experience may be negatively affected.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment consistent with the subject matter of this disclosure, a processing device may identify respective portions of a file, including visual information or audio information, suitable for compressing and saving at different bit rates. Component files may be created, based on the identified respective portions, and compressed and saved at the different bit rates. A second processing device may request a copy of the compressed and saved component files. The second processing device may render, or produce, a reasonable facsimile of the file based on the compressed and saved component files.

In some embodiments, a processing device may create a network page, including a reference to the file. The reference to the file may include information indicating a location from which a copy of the file may be obtained. The processing device may replace the reference to the file with references to the compressed and saved component files. The references to the compressed and saved component files may include information indicating one or more locations from which copies of the compressed and saved component files may be obtained. The network page may then be saved. A processing device of a user may request a copy of the network page and the compressed and saved component files. The copy of the network page and the compressed and saved component files may be transferred to the processing device of the user via a network. The processing device of the user may render, or produce, a reasonable facsimile of the file based on the compressed and saved component files.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
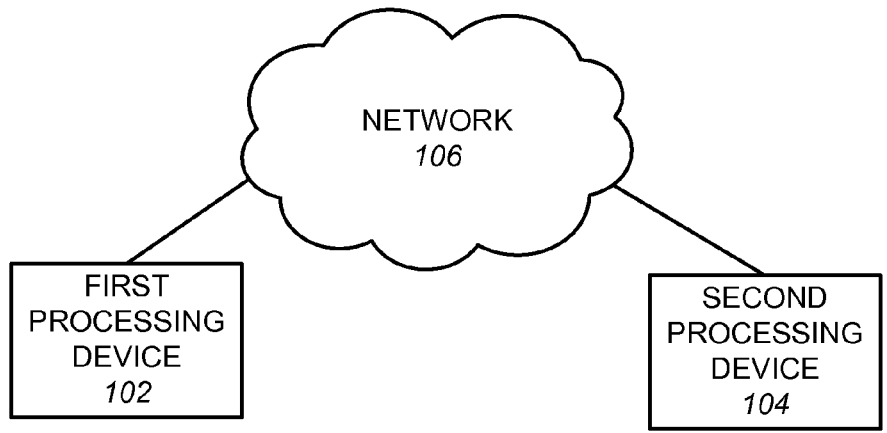
FIG. 1 illustrates an exemplary operating environment for embodiments consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a system are provided for efficiently optimizing a size of visual information or auditory information. A number of component files may be created from a file including the visual information or the auditory information. Each of the components files may include only a portion of content of the file and may be compressed using a different compression method. A reasonable facsimile of the file may be reproduced based on an aggregate of the compressed component files.

In one embodiment, a file may include an image. Portions of the image may be identified as portions capable of being compressed and saved at respective bit rates, such that a reasonable facsimile of the respective portions of the image may be reproduced from compressed portions. Component image files may be created based only on respective identified portions of the image. The component image files may be compressed and saved at the respective bit rates. A reasonable facsimile of the image may be reproduced based on an aggregate of the component image files.

In a second embodiment, a file may include audio data. Portions of the audio data may be identified as portions capable of being compressed and saved at respective bit rates, such that a reasonable facsimile of the respective portions of the audio data may be reproduced. Component audio files may be created based only on the respective identified portions of the audio data. The component audio files may be compressed and saved at the respective bit rates. A reasonable facsimile of the audio file may be reproduced based on an aggregate of the component audio files.

A network page may be defined as a webpage that may exist on a network, such as, for example, the World Wide Web or another network. In a third embodiment, a created network page, may include a reference to a file including auditory information or visual information. The reference to the file may include information indicating a location from which a copy of the file may be obtained. The file may be uploaded to a processing device, which may create a number of component files based on the uploaded file. Each of the component files may be based only on respective portions of the auditory information or the visual information and may be compressed differently than others of the component files. In the created network page, the reference to the file may be replaced with references to the component files. The references to the component files may include information indicating one or more locations from which copies of the component files may be obtained. Subsequently, when a processing device of a user requests the created network page, the component files may be provided to the processing device of the user, such that a reasonable facsimile of contents of the file may be reproduced and less bandwidth than conventional methods may be used to transfer the file to the processing device of the user via a network.

Exemplary Operating Environment

FIG. 1 illustrates an exemplary operating environment for embodiments consistent with the subject matter of this disclosure. The exemplary operating environment may include a first processing device 102, a second processing device 104, and a network 106. Processing devices 102, 104 may be connected to each other via network 106.

Network 106 may be a single network or a combination of networks, such as, for example, the Internet or other networks. Network 106 may include a wireless network, a wired network, a packet-switching network, a public-switched telecommunications network, a fiber-optic network, other types of networks, or any combination of the above.

Processing device 102 may be a desktop personal computer (PC), a laptop or notebook PC, or other type of processing device which may request a network page via network 106. Processing device 104 may be a server, server farm, or other type of processing device which may provide a network page to a requesting processing device via network 106.

The operating environment of FIG. 1 is only exemplary. Other operating environments may have more or fewer processing devices and/or more networks. For example, in some operating environments, additional processing devices may communicate with second processing device 104 via network 106.

Exemplary Processing Device

Figure 2:
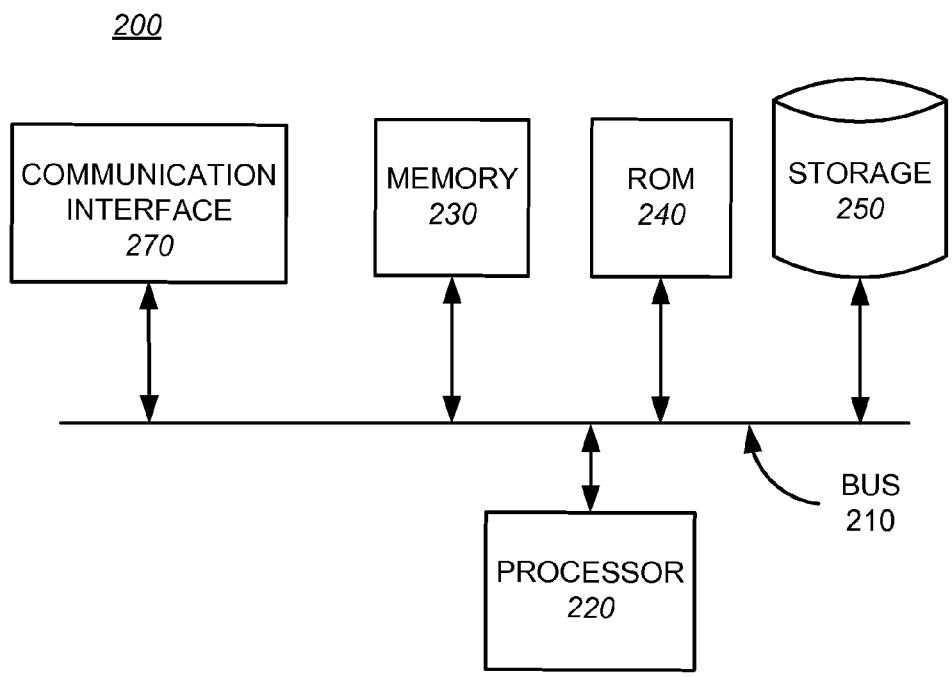
FIG. 2 illustrates a functional block diagram of an exemplary processing device, which may be used to implement embodiments consistent with the subject matter of this disclosure.

FIG. 2 is a functional block diagram of an exemplary processing device 200, which may be used to implement processing device 102 or processing device 104 in embodiments consistent with the subject matter of this disclosure. Processing device 200 may be a desktop personal computer (PC), a notebook or laptop PC, a server, or other processing device. Processing device 200 may include a bus 210, a memory 230, a read only memory (ROM) 240, a communication interface 270, a processor 220, and a storage device 250. Bus 210 may permit communication among components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 130 may store temporary variables or other intermediate information used during execution of instructions by processor 220. ROM 240 may include a conventional ROM device or another type of static storage device that stores static information and instructions for processor 220. Storage device 250 may include a hard disc and corresponding drive, or other type of data storage device for storing data and/or instructions for processor 220. Communication interface 270 may permit processing device 200 to communicate via a network wirelessly, or through a cable.

Processing device 200 may perform functions in response to processor 220 executing sequences of instructions contained in a tangible machine-readable medium, such as, for example, memory 230, ROM 240, storage device 250 or other media. Such instructions may be read into memory 230 from another machine-readable medium or from a separate device via communication interface 270.

Exemplary Processing

Figure 3:
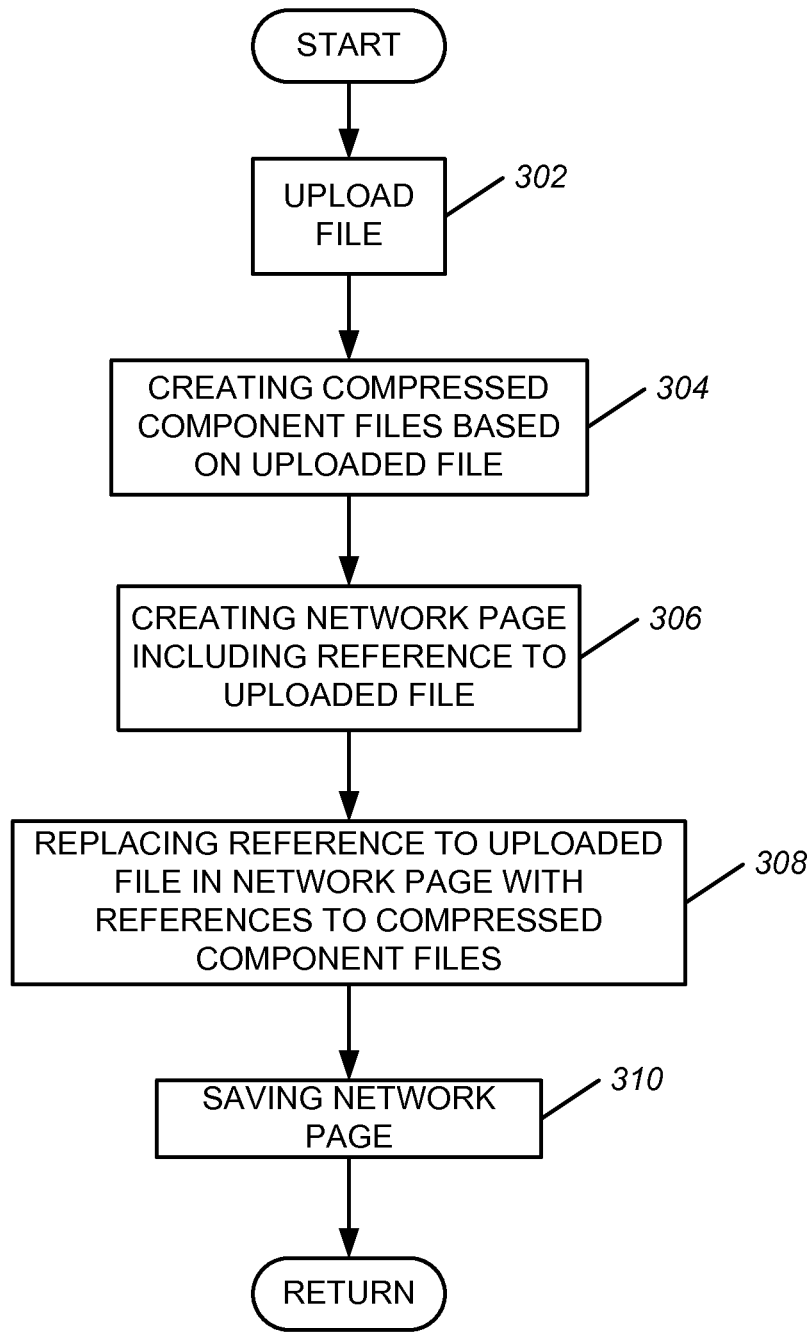
FIG. 3 is a flowchart that illustrates an exemplary process for creating compressed component files from an uploaded file and replacing, within a network page, a reference to the uploaded file with references to the compressed component files.

FIG. 3 is a flowchart illustrating an exemplary process, which may be performed in embodiments consistent with the subject matter of this disclosure. The process may begin with a user, such as, for example, a network site designer, uploading a file, including visual information or auditory information, from a first processing device to a second processing device (act 302). In some embodiments, the uploaded file may be compressed while in other embodiments, the uploaded file may not be compressed. The second processing device may then create compressed component files based on the uploaded file (act 304).

Figure 4:
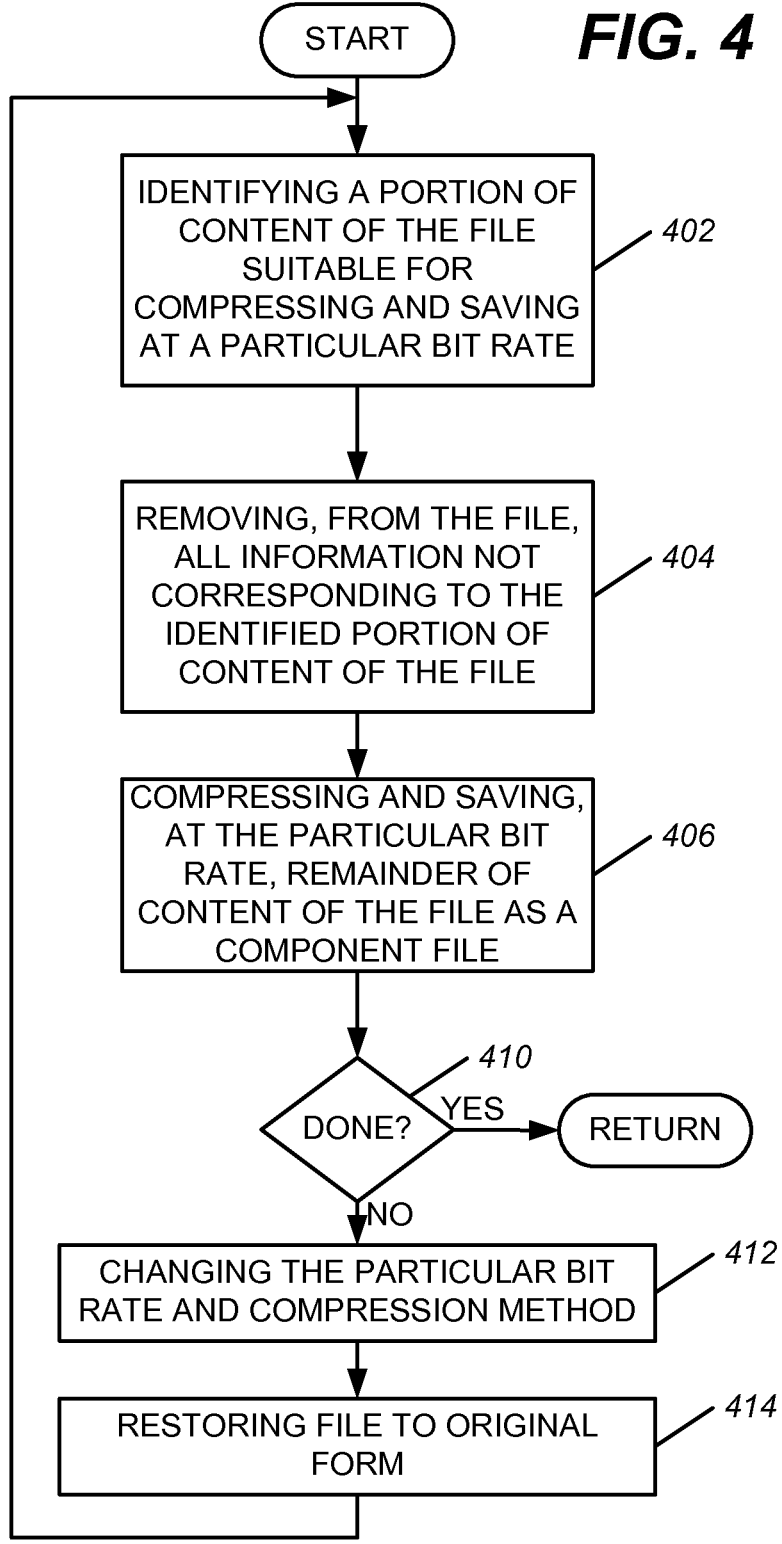
FIG. 4 is a flowchart that illustrates an exemplary process for creating component files from an uploaded file and compressing and saving the component files at particular bit rates

FIG. 4 is a flowchart illustrating an exemplary process for performing act 304 by the second processing device in embodiments consistent with the subject matter of this disclosure. The process may begin with the second processing device identifying a portion of content of the file, such that the identified portion is suitable for compressing and saving at a particular bit rate and reproducing a reasonable facsimile of the identified portion from the compressed and saved portion (act 402). In embodiments in which the file is compressed, the second processing device may uncompress the file before performing act 402.

All information that does not correspond to the identified portion may then be removed from the file (act 404). A remainder of content of the file may be compressed, using a particular compression method, and saved, at the particular bit rate, as a compressed component file (act 406). The second processing device may then determine whether creation of component files is completed by determining whether any other portions of the content of the file may be identified for compressing and saving at another bit rate (act 410). If no other portions of the contents of the file may be identified for compressing and saving, then the process may be completed. Otherwise, the particular bit rate and the particular compression method may be changed (act 412) and the file may be restored to an original form (act 414). The second processing device may then repeat acts 402-410.

Alternatively, instead of removing, from the file, all information not corresponding to an identified portion of content of the file and saving a remainder of the content of the file as a component file. In other embodiments, only the identified portion of the content of the file may be copied, compressed using the particular compression method, and saved in a compressed component file, at the particular bit rate.

Figure 5:
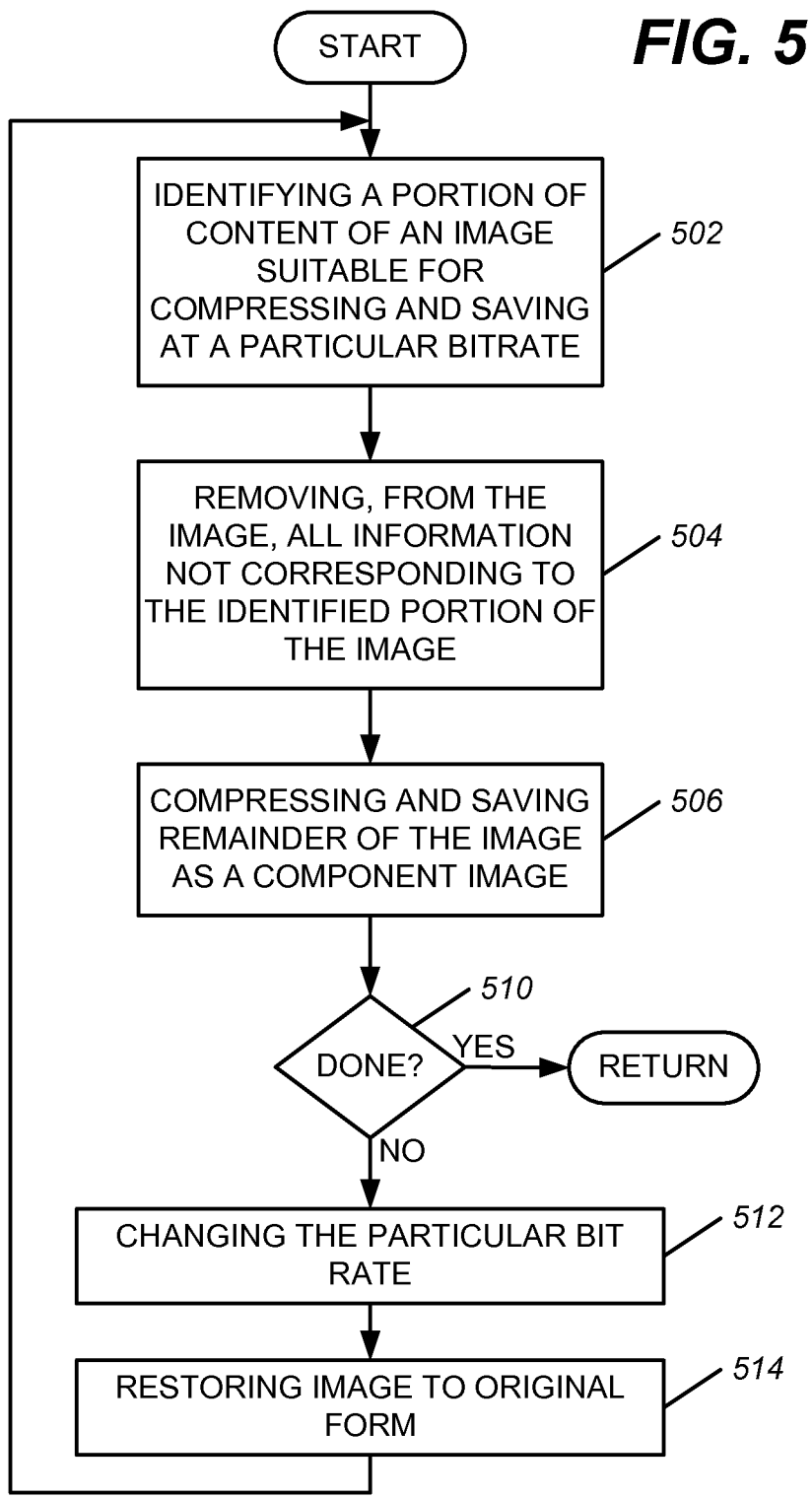
FIG. 5 is a flowchart that illustrates an exemplary process for creating component image files from an image.

FIG. 5 is a flowchart illustrating the exemplary process of act 304, with respect to a file including an image. The process may begin with the second processing device identifying a portion of content of an image suitable for compressing and saving at a particular bit rate (act 502). The second processing device may then remove, from the image, all information that does not correspond to the identified portion of the image (act 504). The second processing device may then compress and save, at the particular bit rate, a remainder of the image as a component image file (act 506). The second processing device may then determine whether additional component image files may be created based on the image by determining whether any other portions of the image may be identified for compressing and saving at another bit rate (act 510). If no other portions of the image may be identified, then the process may be completed. Otherwise, the particular bit rate may be changed (act 512) and the file may be restored to an original form (act 514). The second processing device may then repeat act 502-510.

Figure 6:
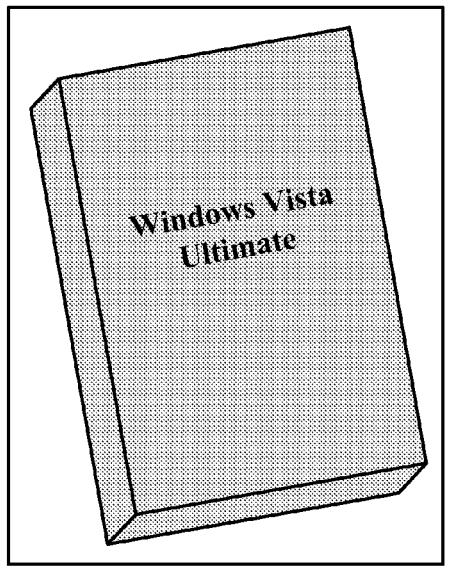
FIGS. 6-8 illustrate an original image, a low-bitrate compressed image, and a high-bit rate compressed image, respectively, consistent with the subject matter of this disclosure.
Figure 7:
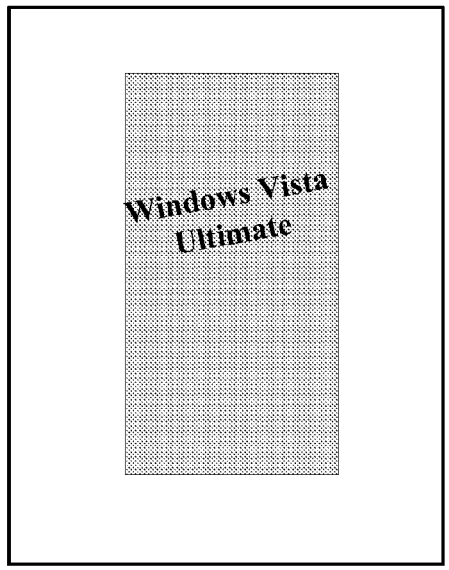
Figure 8:
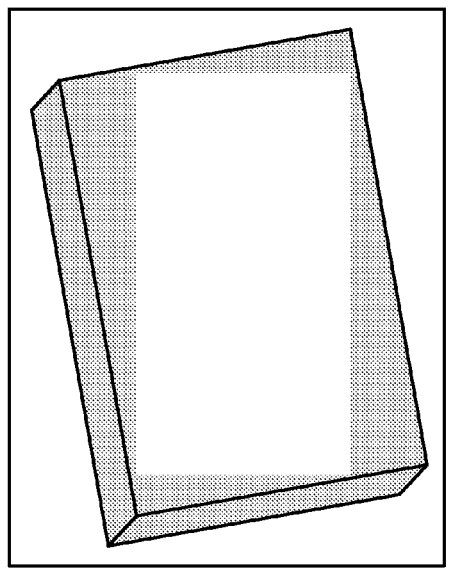

Typically, when an image is compressed with a high compression ratio (low bitrate), a reproduction of the image based on the compressed image may have jagged edges along an edge of an object appearing the image. Other losses in image quality may also become obvious. FIGS. 6-8 illustrate an original image and two component images which may be created, based on the original image, in embodiments consistent with the subject matter of this disclosure.

In one embodiment consistent with the subject matter of this disclosure, starting from a center of an object appearing in an image, a largest rectangular area within the object may be identified and saved at a lower bitrate to produce a lower bitrate component image. FIG. 7 illustrates an exemplary lower bit rate component which may be produced based on the original image shown in FIG. 6. A portion of the original image, not including the portion corresponding to the image of FIG. 7, may be identified and saved at a higher bit rate to produce a higher bit rate component image. FIG. 8 illustrates an exemplary higher bit rate component which may be produced based on the original image shown in FIG. 6. In this example, the higher bit rate component image may include a portion of an object, in the image, including edges of the object. A reasonable facsimile of the original image may be reproduced from an aggregate representation of the component images. In many cases, a user may not detect a difference between the original image and the reasonable facsimile of the original image.

Figure 9:
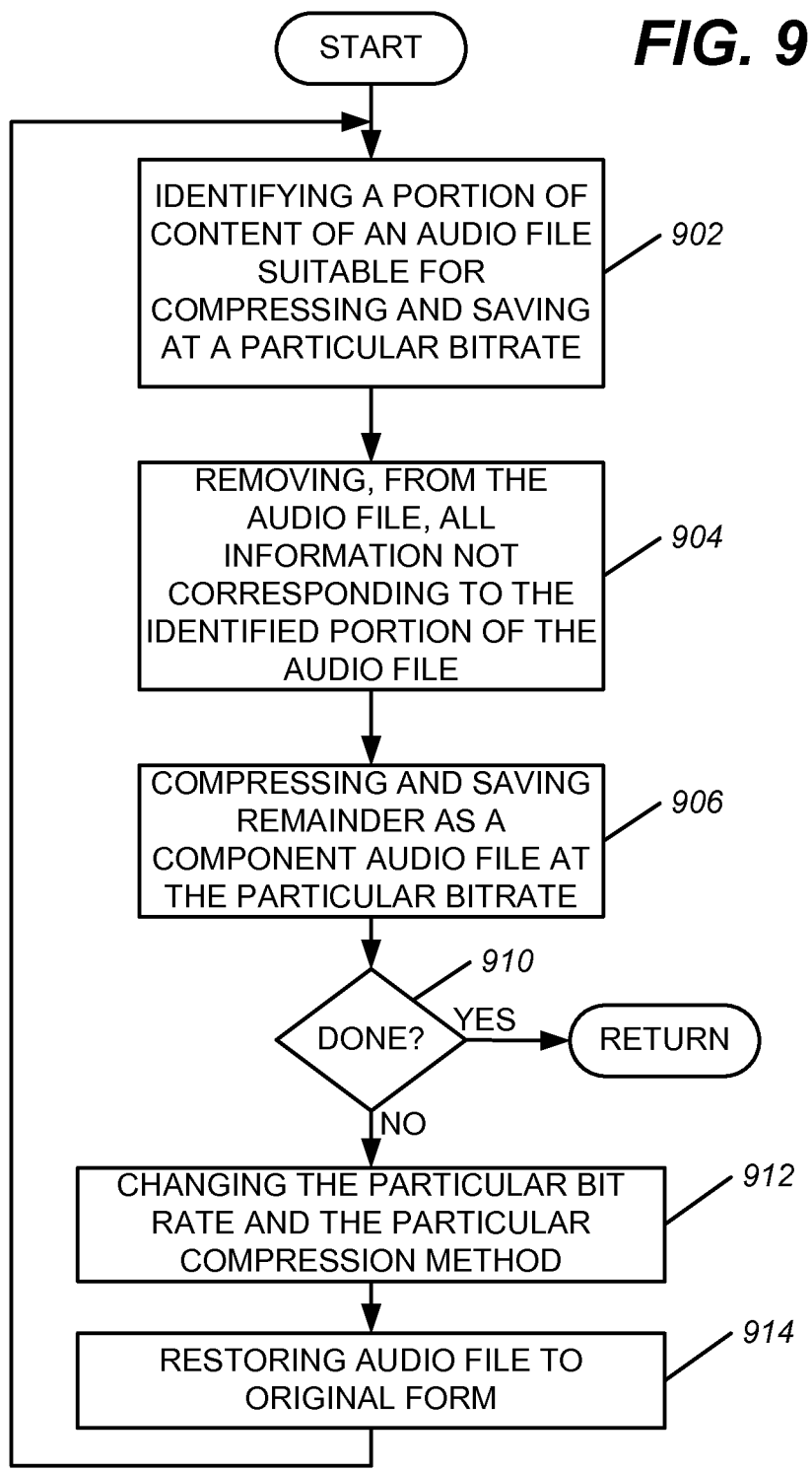
FIG. 9 is a flowchart that illustrates an exemplary process for creating component audio files from an audio file.

FIG. 9 illustrates exemplary processing of act 304 with respect to an audio file including auditory information. In one embodiment, the auditory file may include audio from a number of musical instruments. The musical instruments may produce sounds in various frequency ranges. Audio, including some frequency ranges, may be compressed and saved at a low bit rate and subsequently, adequately reproduced from the compressed and saved low bit rate audio. Audio including other frequency ranges may be compressed and saved at other bit rates, such that a reasonable facsimile thereof may be reproduced from the compressed and saved audio. In another embodiment, audio data may include audio of one or more human voices and audio data including other sounds. A portion of the audio data including the one or more human voices may be identified, compressed and saved at a high bit rate to produce a high bit rate component audio file. A remainder of the audio file may be compressed and saved at a low bit rate to produce a low bit rate component audio file.

The process of FIG. 9 may begin with the second processing device identifying a portion of content of an audio file suitable for compressing and saving at a particular bit rate and reproducing a reasonable facsimile thereof (act 902). For example, a portion of the content may be identified based on a frequency range of audio included in the portion of the content. The second processing device may remove, from the audio file, all information not corresponding to the identified portion of the audio file (act 904). The second processing device may then compress, using a particular compression method, and save, at the particular bit rate, a remainder of the audio file as a component audio file (act 906). A determination may then be made to determine whether any other portions of the audio file remain to be identified (act 910). If there are no other portions of the audio file, then the process may be completed. Otherwise, the particular bit rate and the particular compression method may be changed (act 912) and the audio file may be restored to an original form (act 914). The second processing device may then repeat acts 902-910.

Returning to FIG. 3, the user may create a network page including a reference to the uploaded file (act 306). The reference to the uploaded file in the network page may then be replaced with the references to the compressed component files (act 308). The created network page may then be saved (act 310). For example, the created network page may be saved to a storage device accessible by the second processing device or another processing device.

In some embodiments, the network page may be created by the user using a site editor. A tool may automatically replace the reference to the uploaded file in the network page with the references to the compressed component files when the site editor saves the created network page.

Figure 10:
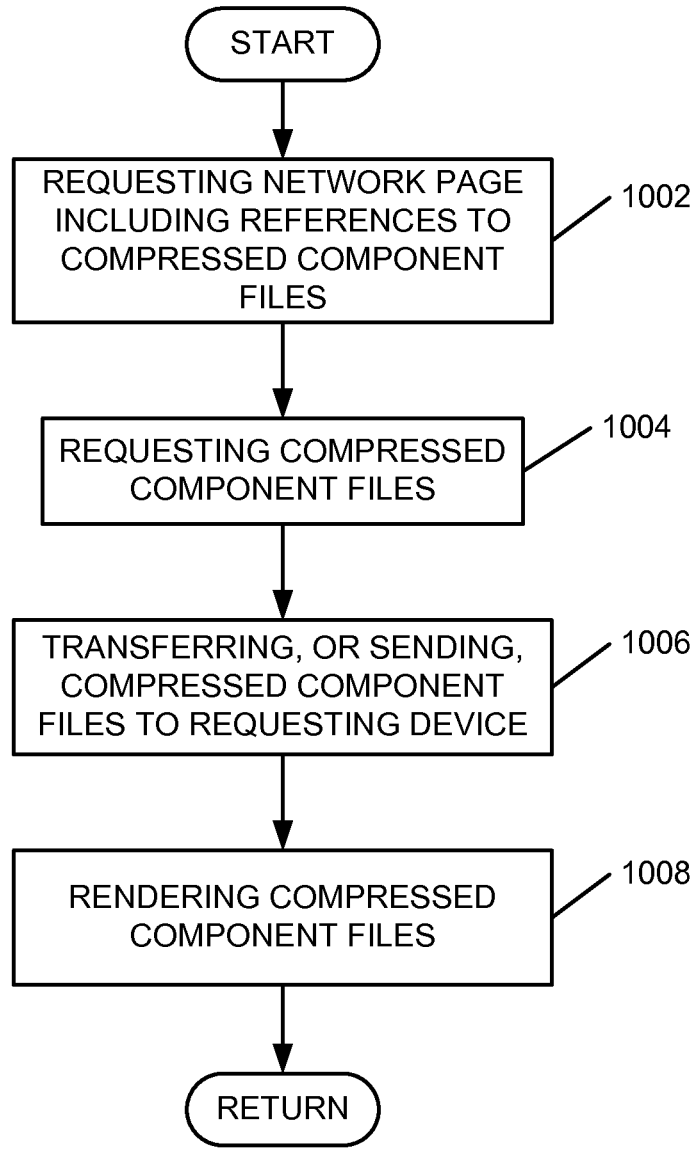
FIG. 10 is a flowchart that illustrates an exemplary process for reproducing a reasonable facsimile of visual information or auditory information from compressed component files which were created from a file including the visual information or the auditory information.

FIG. 10 is a flowchart illustrating an exemplary process, which may be performed in a processing device of a user, when the processing device requests the network page. The process may begin with the processing device requesting a network page, including references to compressed component files (act 1002). The processing device may then request the compressed component files (act 1004). Each of the component files may be compressed using a compression method different from compression methods used to compress other component files. The requested component files may then be transferred, or sent, to the processing device of the user via a network (act 1006). The processing device of the user may render an aggregate representation of the compressed component files, thereby producing a reasonable facsimile of an original file, from which the component files are based (act 1008).

In some embodiments, when reproducing an image from composite images, placement of the composite images in a produced aggregate image may be accomplished by using Cascading Style Sheets (CSS) style properties to place a low bit rate component as an image background and a high bit rate component as an actual image. Of course, in other embodiments, other methods may be used for the placement of composite images in the produced aggregate image, such as use of custom software or other methods.

Miscellaneous

Some of the exemplary embodiments discussed above may create two compressed component files based on an original file including auditory information or visual information. However, embodiments consistent with the subject matter of this disclosure are not limited to creating only two compressed component files based on an original file. For example, in other embodiments, a third component file may be produced, compressed, and saved at an intermediate bit rate based on an identified portion of the file. In further embodiments, more than three component files may be produced, compressed, and saved at various bit rates based on corresponding identified portions of the file.

An exemplary method of identifying portions of an image was previously discussed, in which a low bit rate portion of the image is identified by a largest rectangular area which may be created in an object in the image. In other embodiments, a different shape may be employed, such as, for example, a circle, or other shape. In one embodiment, the shape may be based on a shape of the object in the image. For example, an object having an irregular shape in an image may have a low bit rate portion having the irregular shaped area identified within the object. The identified portion may extend to, but not include, edges of the object. In other embodiments, other methods may be employed to identify portions of a file including visual information to be compressed at particular bit rates. For example, the portions may be identified and separated based on color, or other criteria. The visual information may include video as well as image data.

Further, in various embodiments, the file may include either visual information, audio information, or both visual information and audio information. In some of the various embodiments, portions of the audio information may be identified and separated based on frequency or other criteria.

In some embodiments, component files produced from an original file of visual and/or auditory information may have a same format. In other embodiments, the component files produced from the original file may have different formats. In such embodiments, one format may be used for component files compressed at one bit rate and another format may be used for component files compressed at a second bit rate. Further, when creating component image files, one embodiment may create component image files having a same outer dimension, or canvas size, to simplify reconstruction of an image. Another embodiment may create component image files having different outer dimensions, or canvas sizes.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 3-10, or may implement acts in a different order than as shown. Accordingly, the appended claims and their legal equivalents define the invention, rather than any specific examples given.

We claim as our invention:

1. A machine-implemented method for requesting and rendering compressed visual information or auditory information, the machine-implemented method comprising:
   requesting, by a first processing device, a network page from at least one second processing device;
   receiving the network page by the first processing device via a network in response to the requesting the network page, the network page including references to a plurality of compressed component files, each of the plurality of compressed component files being based on a respective portion of an original file;
   requesting, by the first processing device, the plurality of compressed component files;
   receiving the plurality of compressed component files by the first processing device via the network in response to the requesting the plurality of compressed component files; and
   rendering, by the first processing device, an aggregate representation of the plurality of compressed component files to produce a facsimile of the original file.

2. The machine-implemented method of claim 1, wherein at least two of the plurality of compressed component files are compressed at different bit rates from each other.

3. The machine-implemented method of claim 1, wherein the plurality of compressed component files are based on an image and are compressed at respective particular bit rates.

4. The machine-implemented method of claim 3, wherein a first compressed component file of the plurality of compressed component files, based on a first portion of the original file including a representation of an edge of an object, is compressed at a higher bit rate than a second compressed component file, based on a second portion of the original file not including the representation of the edge of the object.

5. The machine-implemented method of claim 3, wherein the rendering an aggregate representation of the plurality of compressed component files further comprises:
   using cascading style sheets style properties to place a low bit rate component as an image background and a high bit rate component as an actual image.

6. The machine-implemented method of claim 1, wherein the plurality of compressed component files are based on the auditory information.

7. The machine-implemented method of claim 6, wherein a respective content of each of the plurality of compressed component files is based on a respective frequency range.

8. A processing device comprising:
   at least one processor; and
   a memory connected to the at least one processor, the memory including instructions for the at least one processor to perform a method comprising:
      receiving a network page via a network, the network page including references to a plurality of compressed component files, each of the plurality of compressed component files being based on a respective portion of an original file;
      requesting the plurality of compressed component files in response to the receiving the network page;
      receiving the plurality of compressed component files via the network in response to the requesting the plurality of compressed component files; and
      rendering an aggregate representation of the plurality of compressed component files to produce a facsimile of the original file.

9. The processing device of claim 8, wherein the plurality of compressed component files include auditory information.

10. The processing device of claim 9, wherein the plurality of compressed component files are compressed at a plurality of bit rates.

11. The processing device of claim 9, wherein each of the plurality of compressed component files is based on a respective frequency range included in the original file.

12. The processing device of claim 9, wherein:
a first compressed component file of the plurality of compressed component files is based on a first portion of the auditory information including a representation of at least one human voice,
a second compressed component file of the plurality of compressed component files is based on a second portion of the auditory information not including the representation of the at least one human voice, and
the first component file is compressed at a higher bit rate than the second component file.

13. The processing device of claim 8, wherein the plurality of compressed component files are based on an image included in the original file.

14. The processing device of claim 13, wherein:
a first compressed component file of the plurality of compressed component files is based on a first portion of the image not including a representation of an edge of an object and is compressed at a first bit rate,
a second compressed component file of the plurality of compressed component files is based on a second portion of the image including the representation of the edge of the object and is compressed at a second bit rate, and
the second bit rate is higher than the first bit rate.

15. A processing device comprising:
at least one processor; and
a memory including instructions for the at least one processor to perform a method, the method comprising:
receiving a plurality of compressed component files via a network, each of the plurality of compressed component files being based on a respective portion of an original file and being compressed at respective bit rates, a first compressed component file of the plurality of compressed component files being compressed at a first bit rate and a second compressed component file of the plurality of compressed component files being compressed at a second bit rate which is different from the first bit rate; and
rendering an aggregate representation of the plurality of compressed component files to produce a facsimile of the original file.

16. The processing device of claim 15, wherein the plurality of compressed component files are based on respective portions of an image included in the original file.

17. The processing device of claim 16, wherein at least one of the plurality of compressed component files that includes a representation of an edge of an object, is compressed at a higher bit rate than at least one other of the plurality of compressed component files not including the representation of the edge of the object.

18. The processing device of claim 15, wherein each of the plurality of compressed component files is based on a respective portion of auditory information included in the original file.

19. The processing device of claim 18, wherein each of the plurality of compressed component files is based on a respective frequency range included in the original file.

20. The processing device of claim 18, wherein:
one of the plurality of compressed component files includes a sound of at least one human voice, and
the one of the plurality of compressed component files is compressed at a higher bit rate than at least one other of the plurality of compressed component files.

* * * * *